United States Patent [19]

Sorenson

[11] Patent Number: 4,562,318

[45] Date of Patent: Dec. 31, 1985

[54] MOMENTARY SWITCH

[75] Inventor: Richard W. Sorenson, Avon, Conn.

[73] Assignee: Carlingswitch, Inc., West Hartford, Conn.

[21] Appl. No.: 597,442

[22] Filed: Apr. 6, 1984

[51] Int. Cl.[4] .............................................. H01M 5/08

[52] U.S. Cl. ...................................... 200/73; 200/339; 200/160

[58] Field of Search ....................... 200/68.3, 160, 339, 200/335, 153 K, 73

[56] References Cited

U.S. PATENT DOCUMENTS 4,052,579 10/1977 Arthur ............................ 200/159 A 4,203,017 5/1980 Lee ...................................... 200/339

*Primary Examiner*—Stephen Marcus
*Assistant Examiner*—Renee S. Kidorf
*Attorney, Agent, or Firm*—McCormick, Paulding & Huber

[57] ABSTRACT

A conventional rocker switch case has a secondary pair of aligned openings to pivotably receive a uniquely configured rocker in which the lost motion spring couples the rocker to a conventional floating contact and also serves to return the rocker from one of two limit positions to the other limit position. The momentary switch thereby provided utilizes a floating contact rather than a pivotal lever type movable contact of the non-sliding variety.

10 Claims, 2 Drawing Figures

MOMENTARY SWITCH

This invention relates generlly to rocker switches of the type having a one-piece molded plastic case defining an upwardly open cavity with aligned openings for receiving a pivotally mounted actuator or rocker adapted to move a sliding or floating contact. More particularly, this invention relates to the provision in such a switch case of a second set of aligned openings for receiving a unique rocker designed to provide opposed limit positions for the sliding or movable contact, one of such limit positions being momentary in that the rocker will return to a normal limit position unless held in the momentary limit position.

BACKGROUND OF INVENTION

In electric switches of the type having a floating contact that is to be moved between opposed limit positions as a result of sliding or floating motion across the upper end of a center contact, the pivotably mounted rocker/actuator generally has pin means in the form of a depending post that moves with the floating contact and a spring associated with the pin means is generally proivided to bias the contact downwardly against the fixed contacts in the bottom wall of the case. This geometry precludes use of such a floating contact switch in a situation where one of the two limit positions must be "momentary" in that the switch must be held to maintain a particular switch condition. Where this momentary feature is desired a lever type movable contact is generally provided in lieu of the floating type sliding contact. This is a decided disadvantage because lever type movable contacts are generally more expensive to manufacture and can be less desirable in operation due to the lack of a continuing wiping action as the switch is utilized in service.

The primary purpose of the present invention is to provide a momentary switch that utilizes a floating contact. Another purpose of the present invention is to provide such a momentary switch where the floating contact is coupled to the actuator by means of a spring provided on a depending post of the actuator which posts projects through an opening in the movable contact lever in the manner shown in my issued U.S. Pat. No. 4,347,417. Said patent is incorporated by reference herein for purposes of a more complete description of the coupling provided between a floating contact and a conventionally mounted one piece rocker/actuator coupled to it as shown in said patent.

SUMMARY OF THE INVENTION

These advantages are achieved in a momentary switch constructed in accordance with the present invention, wherein the switch case defines an upwardly open cavity of generally rectangular configuration with the fixed contact provided in spaced relationship in the switch case bottom wall. One of the fixed contacts is centered in the switch case and has an upper end defining a fulcrum for the floating or movable contact. Another fixed contact is provided in spaced relationship to the center contact and a uniquely configured rocker is pivotably provided for movement on a pivot axis that is located vertically above the second fixed contact so that a spring, provided on the depending post or pin portion of the actuator, will always exert a restoring moment on the rocker tending to urge the rocker toward one of its two limit positions, preferably the OFF position such that the floating or movable contact is not in contact with the fixed contact provided immediately below the pivot axis of the rocker.

DETAIL DESCRIPTION

Figure 1:
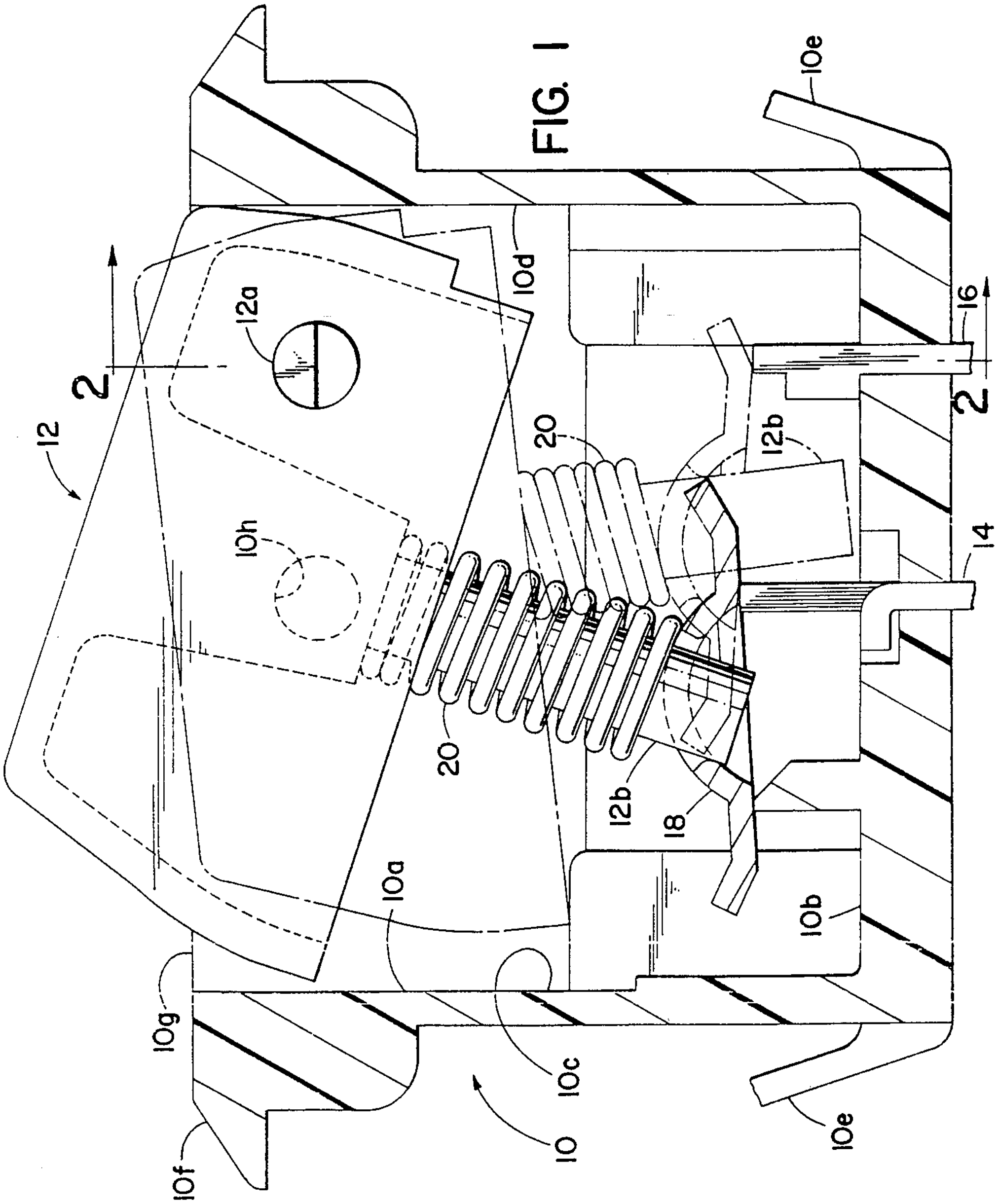
FIG. 1 is a vertical sectional view through a switch constructed in accordance with the present invention and illustrates the actuator in its normal position in full lines and in its momentary position in phantom lines.

Turning now to the drawings in greater detail, FIG. 1 shows a switch base or case 10 having an upwardly open cavity 10*a*, which cavity is defined in part by a bottom wall 10*b* and by end walls 10*c* and 10*d*. This switch case 10 is of generally conventional external configuration having wings 10*e* adapted to mount the case in a panel opening and having bezel portion 10*f* extending peripherially around the upper edge portion thereof. The switch case cavity is further defined by opposed side walls only one of which is shown in FIG. 1 at 10G, the near wall (not shown) being a mirror image of the wall 10*g*.

Aligned openings 10*h* may be provided in the switch case side walls 10*g* in order to receive a conventional rocker of the type shown and described in my above mentioned prior art patent. In accordance with the present invention, and as best shown in FIG. 2, a second set of aligned openings 10*j*, 10*j* are provided in offset relationship to the openings 10*h* for receiving projecting axially aligned portions 12*a*, 12*a* in a non-symmetrical rocker/actuator 12 to be described.

Still with reference to the switch case 10, the bottom wall 10*b* has spaced slots provided therein for receiving fixed contacts 14 and 16 which contacts are preferably of the strip/terminal type, that is these terminals 14 and 16 are formed from a flat strip and may be staked into position as suggested in FIG. 1. The fixed contact 14 has an upper end fomred with a notch and defining a fulcrum for slidably and pivotable receiving floating contact 18, which contact may be similar to that shown and described in my above mentioned prior art patent. It should be noted that the aligned openings 10*h*, 10*h* in the side walls 10*g* of the switch case 10 are provided in spaced relationship vertically above the fulcrum defining upper end of this fixed center contact 14. It should also be noted that the offset openings 10*j*, 10*j* provided in the side walls 10*g* to receive the projecting portions 12*a*, 12*a* of the rocker 12 are provided immediately above the other fixed contact 16.

Figure 2:
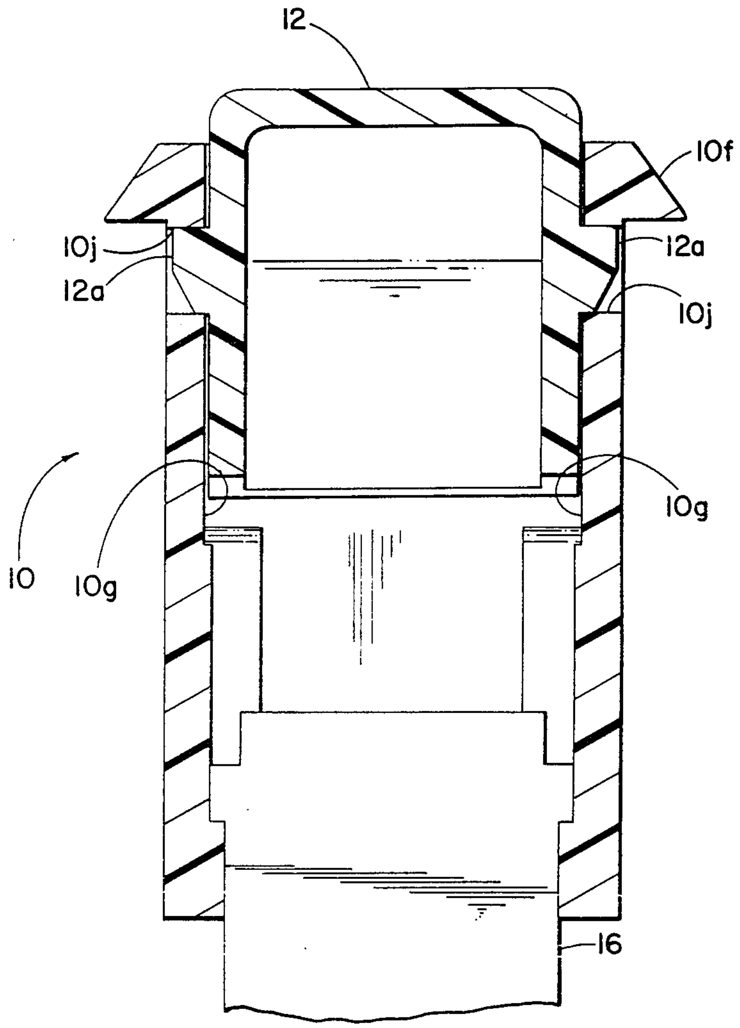
FIG. 2 is a sectional view taken generally on the line 2—2 of FIG. 1.

Considering next the configuration for rocker/actuator 12, FIG. 2 shows the projecting portions 12*a*, 12*a* of the rocker as pivotably received in the aligned openings 10*j*, 10*j* provided above the fixed contact 16. FIG. 1 shows rocker 12 with a downwardly projecting post 12*b* provided in centered relationship with respect to the switch case 10 and as so configured said post 12*b* is adapted to support a coiled compression spring 20 that serves in cooperation with the post 12*b* as a lost motion coupling between the rocker 12 and the flotaing contact 18. The lower end of post 12*b* projects through a central opening provided for it in the floating contact 18 so as to permit the post 12*b* to move from its solid line position shown in FIG. 1 to the phantom line position illustrated in that view as the rocker 12 is moved between the two positions shown for it laterally spaced lands alongside this central opening engage the lower end of the spring 20 as suggested in FIG. 1. It will be apparent that the spring 20 is compressed slightly in the solid line position shown for rocker 12 and spring 20. It will also be apparent that in the phantom line position shown for rocker 12 and for compression spring 20 the latter will be further compressed, and hence the force between floating contact 18 and the rocker/actuator 12 will experience a restoring moment such that the contact and the rocker are urged from the phantom line position shown to the solid line position in FIG. 1. As so constructed and arranged return movement for the movable contact 18 from the phantom line position to the solid line position in that view is provided for in a very efficient manner.

Switch case 10 can be utilized in a conventional two position switch of the type shown and described in my prior U.S. Pat. No. 4,347,417, or the switch case 10 can be adapted to receive a rocker 12 of the type shown and described above. The two sets of aligned openings in the switch case side walls 10*g* are adapted to support either a conventional rocker such as that shown in my prior art patent or the rocker 12 shown and described herein.

I claim:

1. A momentary switch comprising a switch case having side, end and bottom walls defining an upwardly open cavity of generally rectangular configuration, fixed contacts provided in horizontally spaced relationship in said switch case bottom wall, one of said fixed contacts having an upper end defining a fulcrum, a floating contact slidably and pivotably received on said fixed contact fulcrum, an actuator pivotably mounted in said switch case cavity for movement between opposed first and second limit positions, coupling means between said actuator and said floating contact to cause movement of the latter in response to pivotal movement of the actuator so that said floating contact is shifted between first and second limit positions corresponding to said first and second actuator limit positions respectively, said coupling means including lost motion means acting between predetermined regions of said floating contact and of said actuator so that said floating contact and actuator pivot oppositely relative to one another, said lost motion means including a compression spring acting between said predetermined regions of said actuator means and said floating contact, said actuator being pivotably supported in said switch case for movement relative to an actuator pivot axis, said actuator axis being offset from said fulcrum for said floating contact and provided vertically above another of said fixed contacts so that said actuator and floating contact are biased toward one of said opposed limit positions by said spring to provide a momentary switch action in the other of said opposed limit positions.

2. The switch of claim 1 wherein said predetermined region of said actuator comprises a centerally located spring seat defining area against which said spring acts, and said predetermined region of said floating contact comprises a centrally located recess, said actuator including a depending portion received in said floating contact recess to move the latter in response to movement of the actuator.

3. The switch of claim 1 wherein said switch case side walls define aligned openings, said actuator comprising a rocker having projecting axle defining portions received in said aligned openings and defining said actuator pivot axis.

4. A momentary switch comprising a switch case having side, end and bottom walls defining an upwardly open cavity of generally rectangular configuration, fixed contacts provided in spaced relationship in said switch case bottom wall, one of said fixed contacts having an upper end defining a fulcrum, a floating contact slidably and pivotably received on said fixed contact fulcrum, an actuator pivotably mounted in said switch case cavity for movement between opposed first and second limit positions, coupling means between said actuator and said floating contact to cause movement of the latter in response to pivotal movement of the actuator so that said floating contact is shifted between first and second limit positions corresponding to said first and second actuator limit positions respectively, said coupling means including lost motion means acting between predetermined regions of said floating contact and of said actuator so that said floating contact and actuator pivot oppositely relative to one another, said lost motion means including a compression spring acting between said predetermined regions of said actuator and said floating contact, said actuator being pivotably supported in said switch case for movement relative to an actuator pivot axis that is offset from said fulcrum for said floating contact so that said actuator and floating contact are biased toward one of said opposed limit positions by said spring to provide a momentary switch action in the other of said opposed limit positions wherein said predetermined region of said actuator comprises a depending centrally located post, and said spring provided on said post to act between said actuator and said predetermined region of said floating contact, said post projecting through an opening in said floating contact lever to provide said lost motion means.

5. The switch of claim 4 wherein said predetermined region of said floating contact comprises a recess located generally centrally thereof, and said actuator pivot axis provided generally vertically above another of said fixed contacts to urge said actuator and said floating contact toward said one limit position.

6. The switch of claim 5 wherein said predetermined region of said actuator comprises a depending pin, and said spring being carried by said pin and acting between said actuator and said recess of said floating contact, said pin being received in said recess and cooperating with said spring to provide said lost motion means.

7. The switch of claim 6 wherein said recess is more particularly defined by laterally spaced lands which define a through slot therebetween, said pin defined more particularly by a depending post integrally connected to said actuator, said post projecting through said slot to provide said lost motion means, said spring acting between said actuator and said lands.

8. The switch of claim 4 wherein said pivot axis is defined by openings in said switch case side walls located vertically above said another of said fixed switch contacts.

9. The switch of claim 8 wherein said switch case side walls define a second set of aligned openings located vertically above said one fulcrum defining fixed contact.

10. The switch of claim 8 wherein said predetermined region of said actuator comprises a centerally located spring seat defining area against which said spring acts, and said predetermined region of said floating contact comprises a centrally located recess, said actuator including a depending portion received in said floating contact recess to move the latter in response to movement of the actuator.

* * * * *